United States Patent
Huang (10) Patent No.: US 12,412,372 B2
(45) Date of Patent: Sep. 9, 2025

(54) INFORMATION PROCESSING DEVICE, INFORMATION PROCESSING METHOD, AND PROGRAM

(71) Applicant: NEC Corporation, Tokyo (JP)

(72) Inventor: Longshuang Huang, Tokyo (JP)

(73) Assignee: NEC CORPORATION, Tokyo (JP)

( * ) Notice: Subject to any disclaimer, the term of this patent is extended or adjusted under 35 U.S.C. 154(b) by 353 days.

(21) Appl. No.: 18/026,451

(22) PCT Filed: Sep. 29, 2020

(86) PCT No.: PCT/JP2020/036872
§ 371 (c)(1),
(2) Date: Mar. 15, 2023

(87) PCT Pub. No.: WO2022/070250
PCT Pub. Date: Apr. 7, 2022

(65) Prior Publication Data
US 2023/0260254 A1    Aug. 17, 2023

(51) Int. Cl.
*G06K 9/00*     (2022.01)
*G06T 7/11*     (2017.01)
(Continued)

(52) U.S. Cl.
CPC .............. *G06V 10/765* (2022.01); *G06T 7/11* (2017.01); *G06T 7/50* (2017.01)

(58) Field of Classification Search
CPC ...... G06V 10/765; G06V 10/25; G06V 20/64; G06V 20/58; G06T 7/11; G06T 7/50;
(Continued)

(56) References Cited

U.S. PATENT DOCUMENTS 8,861,842 B2 * 10/2014 Jung ...................... G06V 20/58
382/155
11,087,494 B1 * 8/2021 Srinivasan .............. G01S 17/89
(Continued)

FOREIGN PATENT DOCUMENTS

JP    2004-220555 A      8/2004
JP    2016018538 A  *   2/2016    ............... G06K 9/34
(Continued)

OTHER PUBLICATIONS

A Deep-Learning Model with Task-Specific Bounding Box Regressors and Conditional Back-Propagation for Moving Object Detection in ADAS Applications, Guan-Ting Lin et al., MDPI, Sep. 15, 2020, pp. 1-21 (Year: 2020).*
(Continued)

*Primary Examiner* — Jayesh A Patel
(74) *Attorney, Agent, or Firm* — Sughrue Mion, PLLC (57) ABSTRACT

An object recognition unit detects, from image data that represents an image using respective signal values of a plurality of pixels, a first region that is a region representing the object in the image. The object recognition unit determines a first confidence level that is a class confidence level for a first class, the first class being a class of the object represented in the first region. A region recognition unit segments the image of the image data into second regions representing different classes of an object, and determines, for each of second regions, a second class being a class of an object in the second region. An object determination unit determines, as the second class, a class of an object in a non-overlapping region that is the second regions that do not overlap with the first region.

9 Claims, 5 Drawing Sheets

(51) Int. Cl.
  *G06T 7/50* (2017.01)
  *G06V 10/764* (2022.01)
(58) Field of Classification Search
  CPC . G06T 2207/10016; G06T 2207/10028; G06T 2207/20081; G06T 2207/20084; G06T 2207/30252
  See application file for complete search history.

(56) References Cited

U.S. PATENT DOCUMENTS

| | | | | |
|---|---|---|---|---|
| 11,210,537 | B2* | 12/2021 | Koivisto | G06N 3/044 |
| 11,774,554 | B2* | 10/2023 | Vignard | G06T 7/174 |
| | | | | 356/4.01 |
| 2016/0012277 | A1 | 1/2016 | Tate et al. | |
| 2018/0012085 | A1* | 1/2018 | Blayvas | G06F 18/2414 |
| 2018/0259971 | A1* | 9/2018 | Nishimura | B25J 9/1697 |
| 2018/0357772 | A1 | 12/2018 | Takemura et al. | |
| 2019/0012798 | A1* | 1/2019 | Amano | G06T 7/11 |
| 2019/0171912 | A1* | 6/2019 | Vallespi-Gonzalez | |
| | | | | G06N 7/01 |
| 2020/0097756 | A1* | 3/2020 | Hashimoto | G06V 10/25 |
| 2021/0019534 | A1* | 1/2021 | Sakamoto | G06F 18/256 |
| 2021/0026355 | A1* | 1/2021 | Chen | G01S 17/89 |
| 2021/0287387 | A1* | 9/2021 | Deegan | G06T 7/10 |
| 2022/0036043 | A1* | 2/2022 | Sakashita | G01S 13/931 |
| 2022/0101628 | A1 | 3/2022 | Sun et al. | |

FOREIGN PATENT DOCUMENTS

| | | | | |
|---|---|---|---|---|
| JP | 2020017136 | A * | 1/2020 | |
| JP | 2020-035098 | A | 3/2020 | |
| JP | 2020113000 | A * | 7/2020 | G06T 3/40 |
| WO | 2017/138286 | A1 | 8/2017 | |
| WO | 2020/116195 | A1 | 6/2020 | |
| WO | 2020/138286 | A1 | 7/2020 | |

OTHER PUBLICATIONS

Object Detection in Remote Sensing Images Based on Improved Bouding Box Regression and Multi-Level Features Fusion, Xiaoling Qian, MDPI, Jan. 2020, pp. 1-21 (Year: 2020).*
End-to-End Panoptic Segmentation With Pixel-Level Non-Overlapping Embedding, Weitong Zhang et al, IEEE, 2019, pp. 976-981 (Year: 2019).*
International Search Report for PCT Application No. PCT/JP2020/036872, mailed on Dec. 1, 2020.

* cited by examiner

INFORMATION PROCESSING DEVICE, INFORMATION PROCESSING METHOD, AND PROGRAM

This application is a National Stage Entry of PCT/JP2020/036872 filed on Sep. 29, 2020, the contents of all of which are incorporated herein by reference, in their entirety.

TECHNICAL FIELD

The present invention relates to an information processing device, an information processing method, and a program.

BACKGROUND ART

Patent Document 1 describes the provision of a surrounding environment recognition device capable of early detection of a moving three-dimensional object even in a situation where a certain moving three-dimensional object is apparently overlapped with another three-dimensional object. The surrounding environment recognition device captures multiple images in a time series, detects three-dimensional objects on the basis of the distances of the objects from the imaging units, detects motion vectors of feature points by tracking the feature points within predetermined areas of the multiple images containing the three-dimensional objects, and detects three-dimensional objects which are present in the areas on the basis of the detection results.

Patent Document 2 relates to an information processing device, an information processing method, a program, a mobile body control device, and a mobile body that improve object recognition accuracy. The information processing device transforms at least one of a captured image acquired by an image sensor and a sensor image representing the sensing result of a sensor whose sensing range at least partially overlaps the image sensor, matches the coordinate system of the captured image with that of the sensor image, and recognizes the object on the basis of the captured image and the sensor image that have been matched with each other in terms of the coordinate system.

PRIOR ART DOCUMENTS

Patent Documents

Patent Document 1: PCT International Publication No. 2020/138286
Patent Document 2: PCT International Publication No. 2020/116195

SUMMARY OF THE INVENTION

Problems to be Solved by the Invention

Distant objects and poor line-of-sight conditions tend to make object detection difficult. On the other hand, depending on the usage situation, a device may be expected to reliably detect an object that is far away from the device of interest or in a situation where the line of sight is poor. For example, when driving on an expressway or in bad weather such as heavy fog or rain, early detection of objects in the direction of travel is important to ensure safety while driving.

An object of the present invention is to provide an information processing method, an information processing method, and a program for solving the above problems.

Solution to Problem

According to the first example aspect of the present invention, an information processing device includes: an object detection unit that detects an object around the information processing device and an object determination unit that determines the class of the object, the object detection unit comprises an object recognition unit and a region recognition unit, the object recognition unit detecting, from image data that represents an image using respective signal values of a plurality of pixels, a first region that is a region representing the object in the image, and determining a first confidence level that is a class confidence level for a first class, the first class being a class of the object represented in the first region, and the region recognition unit segmenting the image of the image data into second regions representing different classes of an object, and determining, for each of second region, a second class that is a class of an object in the second region; and the object determination unit determines, as the second class, a class of an object in a non-overlapping region that is the second regions that do not overlap with the first region, determining, as the second class, a class of an object in an overlapping region that is the second regions that overlap with the first region in case of the first confidence level for the overlapping region lower than a predetermined confidence level threshold, and determining the class of the object in the overlapping region as the first class in case of the first confidence level for the overlapping region equal to or greater than the predetermined confidence level threshold.

According to the second example aspect of the present invention, an information processing method for an information processing device, the information processing device executing: a first step of detecting, from image data that represents an image using respective signal values of a plurality of pixels, a first region that is a region representing the object in the image, and determining a first confidence level that is a class confidence level for a first class, the first class being a class of the object represented in the first region; a second step of segmenting the image of the image data into second regions representing different classes of an object, and determining, for each second region, a second class being a class of an object in the second region; and a third step of determining, as the second class, a class of an object in a non-overlapping region that is the second regions that do not overlap with the first region, determining, as the second class, the class of the object in an overlapping region that is the second regions that overlap with the first region in case of the first confidence level for the overlapping region lower than a predetermined confidence level threshold, and determining the class of the object in the overlapping region as the first class in case of the first confidence level for the overlapping region equal to or greater than the predetermined confidence level threshold.

According to the third example aspect of the present invention, a program causes a computer to operate as an information processing device including: an object detection unit that detects an object around the information processing device and an object determination unit that determines the class of the object, the object detection unit comprises an object recognition unit and a region recognition unit, the object recognition unit detecting, from image data that represents an image using respective signal values of a plurality of pixels, a first region that is a region representing the object in the image, and determining a first confidence level that is a class confidence level for a first class, the first class being a class of the object represented in the first region, and the region recognition unit segmenting the image of the image data into second regions representing different classes of an object, and determining, for each of second region, a second class being a class of an object in the second region; and the object determination unit determines, as the second class, a class of an object in a non-overlapping region that is the second regions that do not overlap with the first region, determining, as the second class, a class of an object in an overlapping region that is the second regions that overlap with the first region in case of the first confidence level for the overlapping region lower than a predetermined confidence level threshold, and determining the class of the object in the overlapping region as the first class in case of the first confidence level for the overlapping region equal to or greater than the predetermined confidence level threshold.

Effects of Invention

According to the present invention, it is possible to more reliably detect objects around an information processing device.

EXAMPLE EMBODIMENTS

An example embodiment of the present invention is described hereinbelow with reference to the appended drawings.

Figure 1:
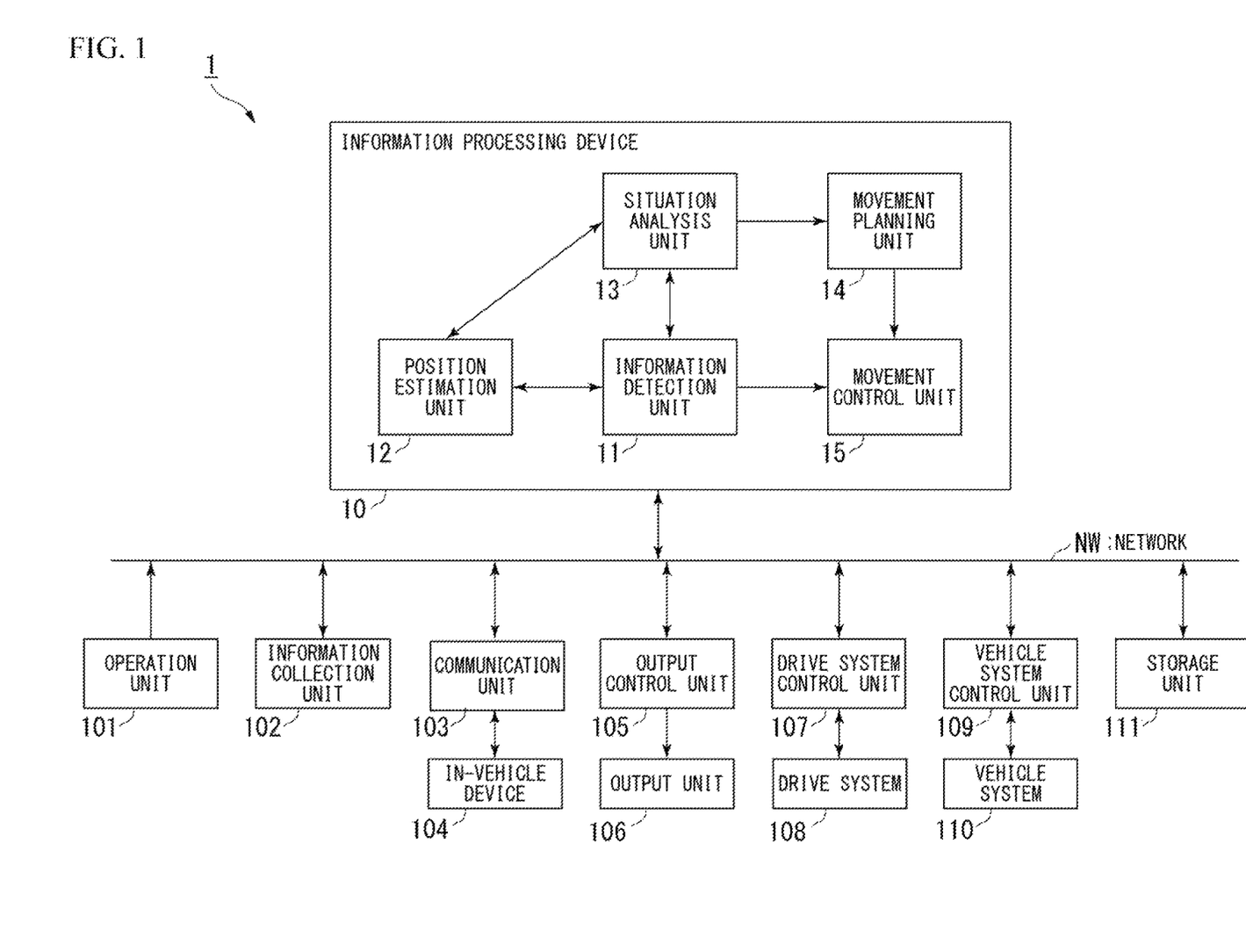
FIG. 1 is a schematic block diagram showing a configuration example of the information processing device according to the present example embodiment.

FIG. 1 is a schematic block diagram showing a configuration example of an information processing device 10 according to the example embodiment of the present invention. In the example shown in FIG. 1, the information processing device 10 is configured as an operation control device and forms part of a vehicle control system 1. While the vehicle control system 1 is mainly installed in a vehicle and used for the operation of the vehicle, in the implementation thereof, some or all of the vehicle control system 1 may not be installed in a vehicle. In the present application, the vehicle in which the vehicle control system 1 and the information processing device 10 are mounted may be referred to herein as the host vehicle, the information processing device 10 may be referred to as the host device, and a constituent part to be explained or processed may be referred to as the host unit.

The information processing device 10 according to the present example embodiment uses image data representing an image using the signal value of each of a plurality of pixels, and depth information representing the depth of an object for each sample point corresponding to the pixel to detect an object represented in the image.

The information processing device 10 detects from the image a region in which an object is represented as a first region, determines the class of the object represented in the first region, and determines a confidence level of the determined class of the object as the first confidence level. On the other hand, the information processing device 10 segments into second regions those regions of the image where objects of different classes are represented, and determines for each second region the class of object represented in that second region. On the basis of depth information indicating the depth of the object for each sample point corresponding to each pixel, the information processing device 10 may adjust the second region so that the depth of the object represented in the second region is maintained within a predetermined range.

The information processing device 10 determines, as a second class, the class of the object in a non-overlapping region among the determined second regions that does not overlap the first region, and determines, as a second class, the class of the object in an overlapping region among the second regions that overlaps the first region if the first confidence level for the overlapping region is lower than a prescribed confidence level threshold. The information processing device 10 determines the class of the object in the overlapping region as the first class if the first confidence level for the overlapping region is equal to or greater than the prescribed confidence level threshold.

The region of the object to be determined is information indicating the position and size of the object, and the class of the object to be determined constitutes part of the information regarding the situation around the host vehicle.

As will be described below, the vehicle control system 1 detects the situation of the host vehicle as well as the situation around the host vehicle, and uses the detected information to control the operation of the host vehicle. In the example shown in FIG. 1, the information processing device 10 functions as a driving control unit that performs processing related to autonomous driving or driving assistance using information regarding the detected situation of the host vehicle and the surrounding situation. More specifically, the information processing device 10 executes processes such as collision avoidance or shock mitigation of the host vehicle, traveling after a leading vehicle while maintaining an inter-vehicle distance, traveling while maintaining a vehicle velocity, warning of collision of the host vehicle, warning of deviation of the host vehicle from a lane, and the like. Further, for example, the information processing device 10 may perform processing for autonomously traveling without relying on operations of the driver.

The vehicle control system 1 includes an operation unit 101, an information collection unit 102, a communication unit 103, an in-vehicle device 104, an output control unit 105, an output unit 106, a drive system control unit 107, a drive system 108, a vehicle body system control unit 109, a vehicle body system 110, a storage unit 111, and the information processing device 10. Each component is connected by wire or wirelessly to other components so that various data can be transmitted between the components using the network NW. The network NW includes, for example, a communication network, data bus and the like conforming to a predetermined standard such as CAN (Controller Area Network) and LAN (Local Area Network).

The operation unit 101 receives operations of a user such as a passenger to the vehicle, and inputs instructions and various data according to the received operations. The operation unit 101 generates an input signal on the basis of input data, instructions, and the like, and supplies the generated input signal to the respective components of the vehicle control system 1. The operation unit 101 includes, for example, operation devices such as buttons, switches, levers, and a touch panel that accept manual operations. The operation unit 101 may include an operation device that detects an operation by means other than manual operation, such as a voice command from an audio signal input from an in-vehicle microphone or a gesture from an image input from an in-vehicle camera. Also, the operation unit 101 does not necessarily need to include an operation device. The operation unit 101 may be provided with an input interface that receives an input signal by wire or wirelessly from an operation device.

The information collection unit 102 collects various types of information used for various processes by the vehicle control system 1. The information collection unit 102 has various sensors for collecting such information. The information collection unit 102 supplies the collected information to the respective components of the vehicle control system 1. The information collection unit 102 is provided with various sensors for detecting environmental information around the vehicle. More specifically, the information collection unit 102 includes, as examples of sensors for detecting surrounding objects, one or a combination of a camera, a ranging sensor and the like. The information collection unit 102 includes, as examples of sensors for detecting the surrounding weather, one or a combination of a raindrop sensor, a fog sensor, a sunshine sensor, a snow sensor, and the like. The information collection unit 102 includes a GNSS (Global Navigation Satellite System) receiver as an example of a sensor for detecting the current position of the vehicle. A GNSS receiver receives GNSS signals from each of four or more satellites orbiting the earth and estimates its position based on the time difference between the received GNSS signals. The information collection unit 102 has various sensors for detecting the driving state of the host vehicle. More specifically, the information collection unit 102 includes a gyroscope, an acceleration sensor, an inertial measurement unit (IMU), and a combination of sensors for detecting an amount of operation of an accelerator pedal, an amount of operation of a brake pedal, the steering angle of the steering wheel, the engine rotation speed, the wheel rotation speed, and the like. The information collection unit 102 also includes various sensors for detecting information regarding the inside of the host vehicle. More specifically, the information collection unit 102 includes a camera that captures images of occupants including the driver, a microphone that collects sounds inside the vehicle, and the like.

The communication unit 103 communicates with the in-vehicle device 104 and external devices that are devices other than the vehicle control system 1, and transmits and receives various data to and from the other units of the vehicle control system 1 wirelessly or by wire. The communication unit 103 may communicate with devices connected to the Internet, a public network, or a private network via a base station or access point that configures an external network. This makes it possible to realize V2X communication such as vehicle-to-vehicle communication, vehicle-to-infrastructure communication, vehicle-to-pedestrian communication, and vehicle-to-home communication. In addition, the communication unit 103 may include a beacon communication unit, which receives radio waves or electromagnetic waves transmitted from wireless stations installed on the road, and thereby may receive information such as the positions thereof, traffic congestion, traffic regulation, required time, and the like.

The in-vehicle device 104 consists of various types of information equipment installed or carried in the vehicle. The in-vehicle device 104 corresponds to a navigation device that searches for and guides a route from a departure point or current position to a destination point, a mobile phone owned by an occupant, or the like.

The output control unit 105 controls the output of various types of information to the occupants of the host vehicle or the outside of the host vehicle. The output control unit 105 controls, for example, generation of at least one of visual information such as image data and auditory information such as audio data, and supply of the generated information to the output unit 106. More specifically, for example, when the possibility arises of the occurrence of an event such as contact, collision, or entry into an area where danger is expected, the output control unit 105 generates audio data including, for example, a warning beep or warning message guidance audio for the event, and supplies the generated audio data to the output unit 106 as an output signal.

The output unit 106 outputs various kinds of information to the occupants of the host vehicle or to the outside of the host vehicle. The output unit 106 is provided with, for example, a liquid crystal display, an instrument panel, an audio speaker, a projector, and a lamp.

The drive system control unit 107 controls the drive system 108 of the host vehicle. The drive system control unit 107 generates various control signals and supplies the generated control signals to the drive system 108. The drive system control unit 107 may output control signals to components other than the drive system 108. As a result, components that are the output destination are notified of the control state of the drive system 108.

The drive system 108 includes various devices related to driving the host vehicle. The drive system 108 includes, for example, a driving force generation device for generating driving force, such as an internal combustion engine, a driving motor, or the like, a driving force transmission mechanism for transmitting the generated driving force to the wheels, a steering mechanism for adjusting the steering angle, a braking device for generating braking force, an antilock braking system (ABS), an electronic stability control (ESC) system, a power steering device, and the like.

The vehicle body system control unit 109 controls the vehicle body system 110 of the host vehicle. The vehicle body system control unit 109 generates various control signals and supplies the generated control signals to the vehicle body system 110. The vehicle body system control unit 109 may output control signals to components other than vehicle body system 110. As a result, components that are the output destination are notified of the control state of the vehicle body system 110.

The vehicle body system 110 includes various devices constituting the vehicle body system of the host vehicle. The vehicle body system 110 includes, for example, a keyless entry system, a smart key system, power windows, power seats, a steering wheel, an air conditioner, and various lamps. The various types of lamps include, for example, headlamps, tail lamps, brake lamps, blinkers, fog lamps, and the like.

The storage unit 111 stores various programs, various types of data, or various acquired data used by the respective components of the vehicle control system 1. The storage unit 111 includes various storage devices such as ROM (Read Only Memory), RAM (Random Access Memory), and a HDD (Hard Disk Drive).

The information processing device 10 includes an information detection unit 11, a position estimation unit 12, a situation analysis unit 13, a movement planning unit 14 and a movement control unit 15. The information processing device 10 may be configured to include a control device such as an ECU (Electronic Control Unit), for example. The information processing device 10 includes a processor such as a CPU (Central Processing Unit), and the processor, as processes using predetermined programs, may execute processes specified by various commands described in the programs to thereby realize the functions of the information detection unit 11, the position estimation unit 12, the situation analysis unit 13, the movement planning unit 14, and the movement control unit 15. In the following description, executing a process instructed by various commands written in a program may be referred to as "execution of the program", "executing the program", or the like.

The information detection unit 11 detects various kinds of information required for driving control of the vehicle. The information detection unit 11 detects, for example, information on the outside of the host vehicle based on data from each unit of the vehicle control system 1. The information detection unit 11 performs, for example, processes of detecting, recognizing, and tracking an object around the host vehicle, and a process of detecting the distance to the object. Objects to be detected include, for example, another vehicle, a person, an obstacle, a structure, a road, a traffic light, a traffic sign, and a road marking. The information detection unit 11 may detect the environment around the host vehicle. The information detection unit 11 detects, for example, the environment around the host vehicle. Examples of the surrounding environment to be detected include, for example, weather, temperature, humidity, brightness, the road surface condition, and the like.

The information detection unit 11 may detect information outside of the host vehicle based on data from each unit of the vehicle control system 1. The information detection unit 11 performs processes of authenticating and recognizing the driver, a process of detecting the state of the driver, a process of detecting an occupant, a process of detecting the in-vehicle environment, and the like. The state of the driver to be detected may include, for example, the degree of concentration, degree of fatigue, line-of-sight direction, and the like. The in-vehicle environment to be detected may include, for example, temperature, humidity, brightness, and the like.

The information detection unit 11 may detect the state of the host vehicle on the basis of data from each unit of the vehicle control system 1. The states of the host vehicle to be detected include, for example, velocity, acceleration, steering angle, presence/absence of anomaly, details of the detected anomaly, state of driving operation, position and inclination of a power seat, state of a door lock, the states of other vehicle-mounted equipment.

The information detection unit 11 outputs detection data indicating the detection results to the position estimation unit 12, the situation analysis unit 13, and the movement control unit 15. A configuration example of the information detection unit 11 will be described later.

The position estimation unit 12 estimates the position and attitude of the host vehicle on the basis of the data supplied from each unit of the vehicle control system 1 including the information collection unit 102, the information detection unit 11, the situation analysis unit 13, and the like. The position estimation unit 12 also generates map information used for estimation of self-position (hereinafter referred to as a self-position estimation map). The position estimation unit 12 applies Simultaneous Localization and Mapping (SLAM), for example, when generating the self-position estimation map. The position estimation unit 12 outputs position data indicating the position and attitude of the host vehicle, which is the estimation result, to the situation analysis unit 13. The position estimation unit 12 stores the generated self-position estimation map in the storage unit 111.

Note that the position estimation unit 12 may output data indicating the recognition result to the information detection unit 11. The information detection unit 11 may use data input from the position estimation unit 12 in order to detect information regarding the outside of the host vehicle.

The situation analysis unit 13 analyzes the situations of the host vehicle and that of the surroundings thereof.

The situation analysis unit 13 analyzes various kinds of map information stored in the storage unit 111 based on data from each component of the vehicle control system 1 such as the position estimation unit 12 and the information detection unit 11, and generates map information containing information used for driving control. The situation analysis unit 13 outputs the generated map information to the movement planning unit 14 and the like.

Based on the generated map information and the data from each component of the vehicle control system 1 such as the position estimation unit 12 and the information detection unit 11, the situation analysis unit 13 performs recognition processing of traffic rules around the host vehicle and recognition processing of the situation regarding the host vehicle. By the traffic rule recognition processing, for example, information such as the position and state of traffic signals around the host vehicle, details of traffic restrictions around the host vehicle, and available lanes are recognized.

The situation analysis unit 13 may generate, for example, a local map as the situation recognition map information for use in recognizing the situation around the host vehicle. The situation of the host vehicle to be recognized can include, for example, the position, posture, motion (i.e., velocity, acceleration, direction of movement, etc.) of the host vehicle, the presence or absence of an abnormality, and the content of an abnormality if one has arisen. The situation surrounding the host vehicle to be recognized includes, for example, the class and position of a surrounding stationary object; the class, position and movement of a surrounding moving object (e.g., velocity, acceleration, direction of movement, etc.); the makeup of surrounding roads and the state of the road surface; and ambient weather, temperature, humidity, and brightness. The state of the driver to be recognized may include, for example, physical condition, wakefulness, concentration, fatigue, gaze movement, driving operation, and the like.

The situation analysis unit 13 outputs data indicating the recognition result to the position estimation unit 12. The situation analysis unit 13 may include the generated situation recognition map information in the data output to the position estimation unit 12. The situation analysis unit 13 stores the generated situation recognition map information in the storage unit 111.

Note that the situation analysis unit 13 may output data indicating the recognition result to the information detection unit 11. The information detection unit 11 may use data input from the situation analysis unit 13 to, for example, detect information regarding the outside of the host vehicle.

Further, the map information, the situation recognition map information, and the self-position estimation map may be supplemented with information on the positions and areas of known roads, facilities, topography, and the like.

The situation analysis unit 13 may perform prediction processing for the situation concerning the host vehicle on the basis of the generated map information, the recognized traffic rule information, information indicating the situation concerning the host vehicle, and other data from the various components of the vehicle control system 1. For example, the situation analysis unit 13 performs prediction processing with respect to the situation of the host vehicle, the situation around the host vehicle, the situation of the driver, and the like. The situation of the host vehicle subject to prediction may include, for example, the behavior of the host vehicle, the occurrence of an anomaly in the host vehicle, and the travelable distance of the host vehicle. The situation around the host vehicle subject to prediction includes, for example, the behavior of moving objects around the host vehicle, changes in the state of traffic lights, and changes in the environment such as the weather. The situation of the driver subject to prediction may include, for example, the behavior and physical condition of the driver.

The situation analysis unit 13 outputs the data indicating the processing result of the prediction processing to the movement planning unit 14 together with data indicating information on the recognized traffic rules and information indicating the situation regarding the host vehicle. Note that the situation analysis unit 13 may output data indicating the processing result of the prediction processing to the information detection unit 11.

The movement planning unit 14 plans a route to a destination on the basis of data from each component of the vehicle control system 1 such as the situation analysis unit 13. The movement planning unit 14 uses, for example, map information to determine a route from the current position to a designated destination. Further, for example, the movement planning unit 14 may change the determined route using situations such as traffic congestion, an accident, traffic restrictions, and construction work, as well as the physical condition of the driver.

The movement planning unit 14 plans the behavior of the host vehicle to travel safely on a predetermined route within a planned time based on data from each component of the vehicle control system 1, such as the situation analysis unit 13. The movement planning unit 14 plans, for example, start, stop, traveling direction (for example, forward, backward, left turn, right turn, a change in direction, and the like), driving lane, driving velocity, overtaking, and the like.

The movement planning unit 14 plans the movement of the host vehicle for realizing a determined behavior on the basis of data from each component of the vehicle control system 1 such as the situation analysis unit 13. The movement planning unit 14 plans, for example, acceleration, deceleration, and travel course. The movement planning unit 14 outputs data indicating the planned movement of the host vehicle to the movement control unit 15.

The movement control unit 15 performs detection processing for emergency states such as collision, contact, entry into a dangerous area, driver abnormality, vehicle abnormality, and the like, based on the data indicating the detection result input from the information detection unit 11. When an emergency state is detected, the movement control unit 15 plans an avoidance movement, which is a movement of the host vehicle for avoiding an abnormal movement such as a sudden stop or a sharp turn.

The movement control unit 15 performs acceleration/deceleration control for realizing the movement of the host vehicle planned by the movement planning unit 14. The movement control unit 15, for example, calculates a control target value of the driving force generating device or the braking device for realizing planned acceleration and deceleration, and sends a control command indicating the calculated control target value to the drive system control unit 107.

The movement control unit 15 performs direction control for realizing the movement of the host vehicle planned by the movement planning unit 14. The movement control unit 15, for example, calculates a control target value for the steering mechanism for realizing the planned traveling course, and outputs a control command indicating the calculated control target value to the drive system control unit 107.

Note that when the host unit has planned an avoidance movement, for example, a sharp turn is prioritized as direction control for realizing the avoidance movement over movement of the host vehicle planned by the movement planning unit 14. In that case, for example, a sharp turn is prioritized as the acceleration/deceleration control for realizing the avoidance movement over the movement of the host vehicle planned by the movement planning unit 14.

Figure 2:
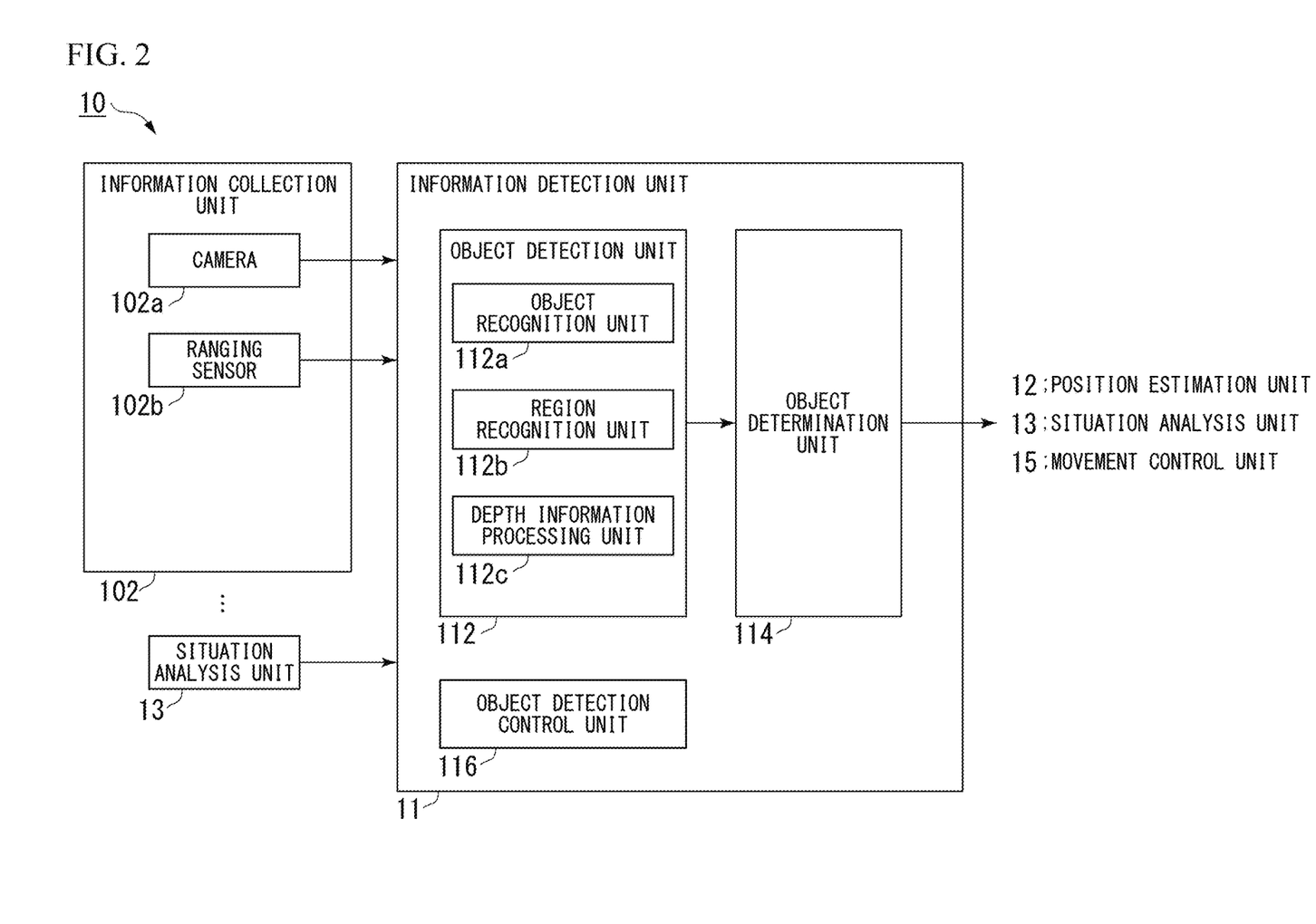
FIG. 2 is a schematic block diagram showing a functional configuration example of the information detection unit according to the example embodiment.

Next, a configuration example of the information detection unit 11 according to the present example embodiment will be described. FIG. 2 is a schematic block diagram showing a functional configuration example of the information detection unit 11 according to this example embodiment.

The information detection unit 11 is provided with an object detection unit 112, an object determination unit 114 and an object detection control unit 116. The object detection unit 112 is provided with an object recognition unit 112a, a region recognition unit 112b, and a depth information processing unit 112c. The information collection unit 102 includes a camera 102a and a ranging sensor 102b.

Image data is input from the camera 102a to the object recognition unit 112a. The camera 102a is installed with the optical axis thereof oriented in a predetermined direction (for example, forward) in the host vehicle. The camera 102a captures an image appearing within the field of view thereof, capturing the captured image using an image sensor, and generates image data including signal values for each pixel two-dimensionally arranged at regular intervals on the image sensor. The position of each pixel included in one frame image corresponds to the direction within the field of view of the camera 102a. The camera 102a outputs the generated image data to the information collection unit 102. The camera 102a is, for example, a digital video camera that captures images at fixed time intervals (for example, $\frac{1}{15}$th to $\frac{1}{60}$th of a second).

The object recognition unit 112a performs image recognition processing on input image data, and detects a region where an object is represented in the image data as a first region. The object recognition unit 112a determines the class of object represented in the first region, and determines the confidence level of the determined class of object as a first confidence level. The object recognition unit 112a, using for example a predetermined first machine learning model (object recognition model), inputs a signal value for each pixel represented by the image data as an input value, and calculates the confidence level for each class of object estimated for each pixel as an output value.

A model parameter of the first machine learning model is acquired in advance by performing model learning using training data including a plurality (typically 1,000 to 10,000 or more) of sets of image data indicating, as input values, the signal value for each pixel representing an image in which, for each class of object, the class and the region where the object is represented are known, and output data in which the output value for each pixel in the region where the object is represented is 1 and the output value for each pixel in other regions is 0. In model learning, the model parameters are successively updated until convergence so that the magnitude of the difference between the calculated value for each pixel calculated using the first machine learning model for the input value and the output value approximates zero. When the amount of change in the model parameters before and after the update or the amount of change in the magnitude of the difference before and after the update is less than a predetermined convergence determination threshold, it can be determined that the model parameters have converged.

Error functions such as the sum of squared differences (SSD) and cross entropy error can be used as index values of the magnitude of the difference.

Therefore, when image data is input to the object recognition unit 112a, it is expected that the region where the object appears and the class of the object are specified as output. The calculated confidence level indicates the accuracy with which the region and class of object appearing are specified.

The object recognition unit 112a can detect as the first region a spatially contiguous region in which the average value between pixels of the confidence level is greater than or equal to a predetermined confidence level detection threshold and is the maximum value between object classes. The object recognition unit 112a determines the maximum value of the confidence level as the first confidence level, and determines the class of the object giving the maximum value as the first class. The object recognition unit 112a outputs object detection information indicating a set of the first confidence level, the first region, and the first class to the object determination unit 114.

The region recognition unit 112b performs segmentation on the image data input from the camera 102a, whereby the image data is segmented into regions in which objects of different classes are represented, and for each segmented region determines the class of object represented in that region.

The region recognition unit 112b, using for example a predetermined second machine learning model (region recognition model), inputs a signal value for each pixel indicated by the image data as an input value, calculates the confidence level for each class of object estimated for each pixel as an output value, and specifies the class of object that gives the highest confidence level.

A model parameter of the second machine learning model is acquired in advance by performing model learning using training data having a plurality of sets of image data indicating, as an input value, a signal value for each pixel representing a region in which multiple objects are represented and an image in which the classes of individual objects are known, and output data in which, for each region in which an individual object is represented, the output value for each pixel in that region is 1 for that object class and 0 for other object classes. In model learning, the model parameters are successively updated until convergence so that the magnitude of the difference between the calculated value for each pixel calculated using the second machine learning model for the input value and the output value approximates zero for each object.

Therefore, when image data is input to the region recognition unit 112b, it is expected that the image is segmented into regions in which individual objects appear as output, and the class of object in each region is specified. The confidence level indicates the accuracy of an object appearing in each region and the class of the object being specified. Note that in the second machine learning model, the object class may be set so that the class of any object is not specified (unspecified). In that case, the region recognition unit 112b may define the regions where the object class is unspecified.

The region recognition unit 112b can, for example, detect as a second region a spatially contiguous region in which the average value between pixels of the confidence level is greater than or equal to a predetermined confidence level detection threshold and is the maximum value between object classes. A region can be detected as a second region. The region recognition unit 112b determines the maximum value of that confidence level as the second confidence level, and determines the class of the object giving the maximum value as the second class. The region recognition unit 112b outputs region recognition information indicating a set of the second confidence level, the second region, and the second class to the object determination unit 114. The region recognition unit 112b may include information indicating the class of object and the confidence level of each pixel in the region recognition information and output the region recognition information to the object determination unit 114.

Distance measurement data is input from the ranging sensor 102b included in the information collection unit 102 to the depth information processing unit 112c. The ranging sensor 102b is provided with a radiation unit that emits radiation waves and a reception unit that receives reflected waves reflected by the surface of an object. The ranging sensor 102b can measure the distance to an object existing in the arrival direction of the reflected wave based on the phase difference between radiated waves and reflected waves and the traveling velocity of the radiated waves. The range of the arrival direction in which the ranging sensor 102b can receive reflected waves includes part or all of the field of view of the camera 102a. The ranging sensor 102b may be, for example, a LiDAR (Light Detection Ranging) system, radar, or the like. LiDAR uses a highly convergent laser beam as the radiation wave. Radar uses electromagnetic waves (for example, millimeter waves) with shorter wavelengths than visible light and infrared rays as radiation waves.

The depth information processing unit 112c, using the arrival direction corresponding to the pixels of image data acquired by the camera 102a as a sample point, calculates the cosine component obtained by projection in the direction of the optical axis of the camera 102a for the distance measured for each sample point as the depth to the object. The depth information processing unit 112c outputs depth information indicating the depth calculated for each sample point to the object determination unit 114.

Note that the depth information processing unit 112c may perform region segmentation on the distance measurement data input from the ranging sensor 102b, segment the distance measurement data into regions where objects of different classes are represented, and determine, for each segmented region, a confidence level for that region. The depth information processing unit 112c does not necessarily have to determine the class of the object if it is possible to determine the region where each object appears based on the depth.

The depth information processing unit 112c, using, for example, a predetermined third machine learning model (region recognition model), may input the signal value for each sample point corresponding to a pixel as an input value, and calculate the confidence level for each region of the object estimated for each pixel as the output value.

A model parameter of the third machine learning model is acquired in advance by performing model learning using training data having a plurality of sets of image data indicating, as an input value, a signal value for each pixel representing a region in which multiple objects are represented, and output data in which, for each pixel in a region where an individual object is represented, the output value for that region is 1 and 0 for other regions. In model learning, the model parameters are successively updated until convergence so that the magnitude of the difference between the calculated value for each pixel calculated using the third machine learning model for the input value and the output value approximates zero for each region.

Therefore, when image data is input to the depth information processing unit 112c, it is expected that the image will be segmented into regions in which individual objects appear as an output. The confidence degree indicates the degree of certainty with which individual regions are identified. In addition, in the third machine learning model, a setting may be made of not belonging to any region (unspecified). In that case, the depth information processing unit 112c may define an unspecified region.

The depth information processing unit 112c can detect as a third region where objects are individually represented a region that is a spatially contiguous region in which the average value between pixels of the confidence level is greater than or equal to a predetermined confidence level detection threshold and is individually maximized. The region recognition unit 112b may add information indicating the third region to the depth information and output the depth information to the object determination unit 114.

In addition, as the first machine learning model, the second machine learning model, and the third machine learning model, for example, a convolutional neural network, a neural network such as a recurrent neural network, or models other than neural networks, such as decision trees and support vector machines, can be applied. The object detection unit 112 may be provided with a model learning unit for learning and generating model parameters of the first machine learning model, the second machine learning model, and the third machine learning model using training data.

The object recognition information, region recognition information, and depth information are input to the object determination unit 114 from the object detection unit 112.

When the first confidence level indicated by the object recognition information is less than a predetermined detection threshold, the object determination unit 114 rejects the first confidence level as well as the first region and first class corresponding to that first confidence level, and saves the first confidence level that is equal to or greater than the predetermined detection threshold and the first region and first class corresponding to that first confidence level.

When the second confidence level indicated by the region recognition information is less than a predetermined detection threshold, the object determination unit 114 rejects the second confidence level as well as the second region and second class corresponding to that second confidence level, and saves the second confidence level that is equal to or greater than the predetermined detection threshold and the second region and second class corresponding to that second confidence level. Therefore, it is possible that the image to be processed will have regions where no objects are detected, or that no objects are detected at all.

The object determination unit 114 adjusts the second region indicated by the region recognition information based on the depth information so that the depth of an object represented in the second region is maintained within a predetermined range. The object determination unit 114, for example, expands or shrinks part of the second region so that the adjusted average depth of the second region is within a predetermined range and the second region is maximized, based on the average depth of each pixel in the second region.

When the depth information includes information indicating a third region, the object determination unit 114 identifies a third region that partially or wholly overlaps the second region, and expands or shrinks part of the second region so that the distribution range of depth per pixel in the adjusted second region fits within the distribution range of depth per pixel in the third region, and the second region is maximized, that is, made as large as possible.

The object determination unit 114 determines, as the second class, the class of the object detected in the non-overlapping region among the second regions that does not overlap the first region. The object determination unit 114 may determine, as the first class, the class of the object detected in the non-overlapping region among the first regions that does not overlap the second region.

The object determination unit 114 determines the class of the object as the second class when the first confidence level is less than a discrimination threshold, which is a predetermined confidence level threshold, in an overlapping region where the first region and the second region overlap. The object determination unit 114 determines the class of the object in the overlapping region as the first class when the first confidence level for the overlapping region is equal to or greater than the discrimination threshold. The discrimination threshold may be equal to the detection threshold, or may be a value higher than the detection threshold. By using a value higher than the detection threshold as the determination threshold, it is possible to place importance on the recognition result of region recognition.

The object determination unit 114 outputs the determined class of the object and object determination information indicating the region in the image to the position estimation unit 12, the situation analysis unit 13, and the movement control unit 15. A region in an image is represented by the position occupied by the object, that is, the range of directions for each pixel and the range of depth for each pixel.

The object detection control unit 116 determines whether or not to activate the region recognition unit 112b and the depth information processing unit 112c on the basis of the situation of the host vehicle and the situation around the host vehicle. The object detection control unit 116 receives data indicating the situation of the host vehicle and the situation around the host vehicle from the situation analysis unit 13, and uses the input data for determination. The input data may include part of the data input from various sensors forming the information collection unit 102. The data indicating the situation around the host vehicle may include information regarding an object detected by the object detection unit 112, such as position and velocity.

All or some of the following operating conditions are set in advance in the object detection control unit 116 as determination targets, and it is determined whether or not each of the operating conditions subject to determination is satisfied. The following operating conditions also include conditions regarding objects or regions detected by the object recognition unit 112a. When any operating condition is satisfied, the object detection control unit 116 determines that the region recognition unit 112b and the depth information processing unit 112c are to be activated, and when none of the operation conditions are met, the object detection control unit 116 determines that the region recognition unit 112b and the depth information processing unit 112c are not to be activated. Upon making a determination to activate the region recognition unit 112b and the depth information processing unit 112c, the object detection control unit 116 outputs control information to the object detection unit 112 for instructing the operation of the region recognition unit 112b and the depth information processing unit 112c.

When the object detection control unit 116 makes a determination to not activate the region recognition unit 112b and the depth information processing unit 112c, the object detection control unit 116 outputs control information to the object detection unit 112 for instructing operation stoppage of the region recognition unit 112b and the depth information processing unit 112c. The region recognition unit 112b and the depth information processing unit 112c respectively perform their own operations when control information for instructing operations is input from the object detection control unit 116. The region recognition unit 112b and the depth information processing unit 112c respectively stop their own operations when control information for instructing operation stoppage is input from the object detection control unit 116.

Any of the following conditions or a predetermined combination can be used as operating conditions for the region recognition unit 112b and the depth information processing unit 112c.

(1) Presence of an object is estimated whose distance from the host device is equal to or greater than a predetermined distance threshold. For example, the object detection control unit 116 may directly determine whether or not there is an object whose distance from the host device, that is, the host vehicle, is a predetermined distance threshold. The object detection control unit 116 may determine whether or not there has arisen an event that is likely to cause a situation in which an object is present at a distance from the host device that is equal to or greater than a predetermined distance threshold, e.g., the host vehicle is within the area of an expressway. The object detection control unit 116 can, for example, refer to map information and determine whether or not the position of the host vehicle is within the area of the expressway shown in the map information. Upon detecting radio waves radiated from an ETC (Electronic Toll Collection) system provided at the entrance and exit of an expressway with an electric field strength equal to or greater than a predetermined electric field strength threshold, the object detection control unit 116 may determine that the host vehicle has entered the expressway or exited the expressway. The object detection control unit 116 can determine that the host vehicle is within the area of the expressway during the period from the time of having entered the expressway to the time it leaves the expressway.

(2) The situation around the host device indicates a predetermined situation that makes it difficult to detect the first region from the image data. The object detection control unit 116 determines, for example, whether or not illuminance indicated by illuminance information directly or indirectly input from a light receiving sensor provided in the vehicle is equal to or higher than a predetermined illuminance threshold. The object detection control unit 116 may determine whether fog information input from a fog sensor provided in the vehicle indicates detection of fog. The object detection control unit 116 may determine whether rainfall information input from a raindrop sensor provided in the vehicle indicates rainfall. The object detection control unit 116 may determine whether or not an input signal indicating a wiper operation forming the operation unit 101 is input.

(3) The number of objects around the host vehicle, that is, the number of objects detected by the object detection unit 112, is equal to or greater than a predetermined number threshold, or the spatial distribution between at least two detected objects is equal to or greater than a predetermined spacing threshold. The spatial interval may be an interval in an actual three-dimensional space, or may be an interval expressed in units of pixels for a plurality of objects detected in an image captured by the camera 102a.

(4) The class of object detected by the object recognition unit 112a is of a predetermined class that tends to cause misrecognition, or none of the object classes is determined, i.e., the object class is unknown.

(5) When the velocity of the host vehicle is equal to or higher than a predetermined velocity threshold, or when the estimated time to collide based on the distance from the host unit to the object detected by the object recognition unit 112a and the velocity of the host vehicle is equal to or less than a predetermined estimated time to collide threshold.

The estimated time to collide is calculated by dividing the difference between the velocity of the vehicle and the velocity of the detected object by the distance to the detected object. The velocity of an object can be calculated by differentiating the position of the object with respect to time.

Figure 3:
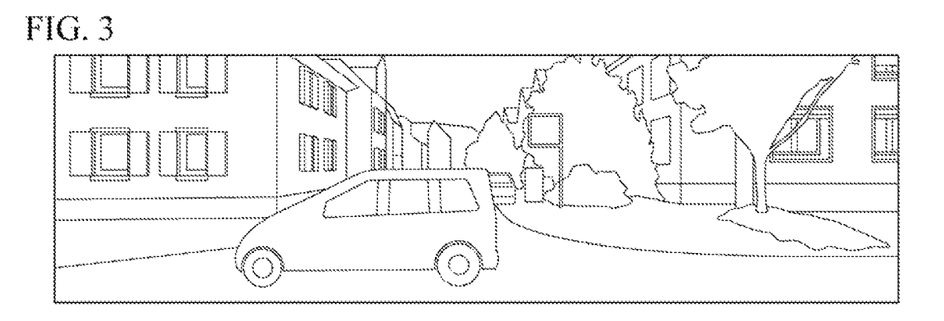
FIG. 3 is a diagram showing an example of image data.

Next, an example of the implementation of the object detection unit 112 and the object determination unit 114 according to the example embodiment is described using the case of the image data shown in FIG. 3 as an example. FIG. 3 exemplifies a case where a vehicle crosses a road extending in the depth direction from right to left in the drawing at an intersection.

Figure 4:
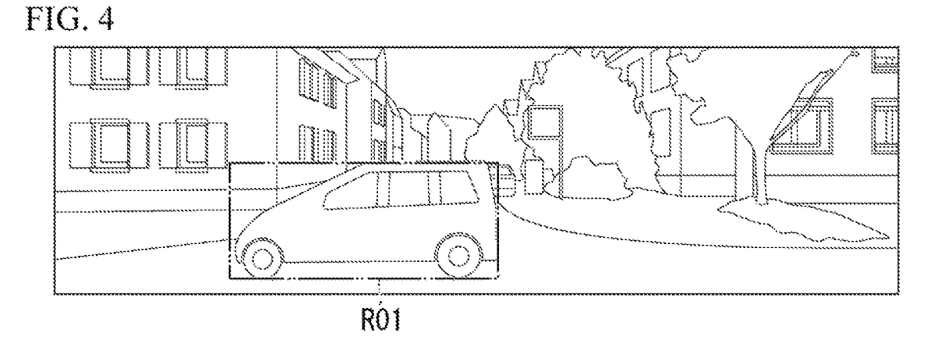
FIG. 4 is a diagram showing a region detected by the object recognition unit according to the example embodiment.

FIG. 4 illustrates a first region representing an object detected by the object recognition unit 112a. In this example, the region representing the vehicle is detected as the first region R01.

Figure 5:
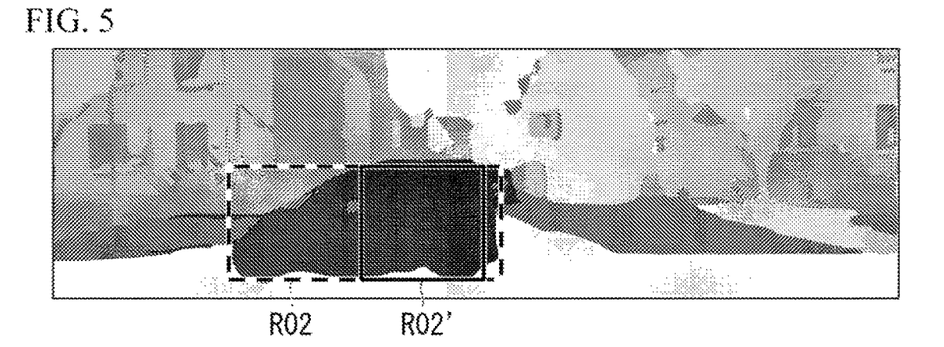
FIG. 5 is a diagram showing a region segmented by the region recognition unit according to the example embodiment and a detected region.

FIG. 5 illustrates the region segmented by the region recognition unit 112b and a second region in which an object is represented. In FIG. 5, individual display patterns (hatching) indicate the segmented regions. Among them, a region whose reliability is equal to or higher than a predetermined detection threshold is detected as a second region R02'. Note that R02 indicates the second region after adjustment.

Figure 6:
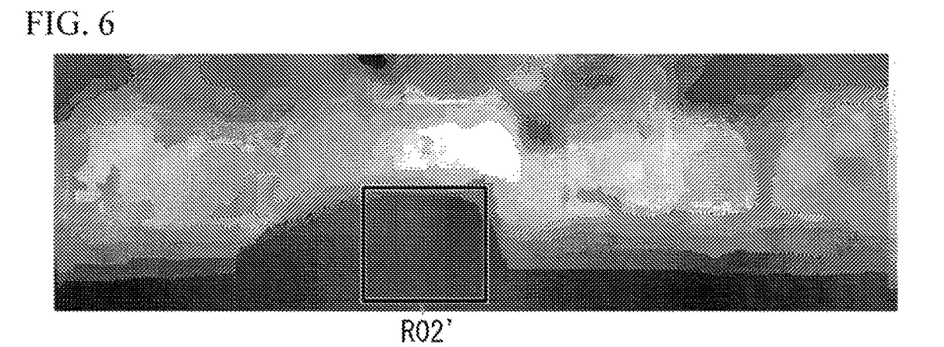
FIG. 6 is a diagram showing a depth image indicating depth acquired by the depth information processing unit according to the example embodiment.

FIG. 6 shows a depth image indicating the depth of each sample point acquired by the depth information processing unit 112c. Each sample point corresponds to a pixel. Depth is indicated by shading, with a darker portion indicating a lower depth (closer) and a brighter portion indicating a higher depth (farther).

In the examples shown in FIGS. 4 to 6, the shapes of the first region R01, the second region R02', and the adjusted second region R02 are each normalized to a rectangle. Although the first region R01 and the second region R02' include regions whose confidence level is equal to or lower than the predetermined detection threshold due to normalization, the region where the object exists is simply defined by normalizing the shape.

For example, the object recognition unit 112a defines the first region R01 as the region between the minimum and maximum coordinate values in the horizontal direction (X direction) of a pixel whose confidence level is above a predetermined detection threshold, and the minimum and maximum coordinate values in the vertical direction (Y direction) of said pixel. The object recognition unit 112a can determine the average value of the confidence level between pixels in the first region R01 as the first confidence level.

The region recognition unit 112b, for example, defines a region in which an object of a predetermined detection target class (a vehicle in the example of FIG. 5) appears as a second region R02' among the segmented individual regions. More specifically, the region recognition unit 112b can define the second region R02' as the region between the minimum and maximum coordinate values in the horizontal direction (X direction) of a pixel for which the confidence level for that class of object is above a predetermined detection threshold and the minimum and maximum coordinate values in the vertical direction (Y direction) of that pixel. The region recognition unit 112b can determine the average value of the confidence level between pixels in the second region R02' as the second confidence level. Note that shape normalization may cause overlap between multiple regions, but the overlap of regions may be allowed.

The object determination unit 114 adjusts the second region R02' determined by the region recognition unit 112b based on the depth information obtained by the depth information processing unit 112c, so that the depth of each sample point corresponding to each pixel in the second region R02' is maintained within a predetermined range, and determines the second region R02 after adjustment. For example, the object determination unit 114 extends the left edge of the second region R02' to the adjacent pixel to the left when, for any pixel at the left edge of the second region R02', there is a pixel for which the magnitude of the difference in depth between the pixel and the adjacent pixel to the left (in the opposite horizontal direction) is equal to or less than the specified difference threshold. Then, the process of extending the left edge of the second region R02' is repeated until there are no more pixels whose magnitude of difference in depth is less than the specified difference threshold between them and the neighboring pixel to the left. The object determination unit 114 can extend the second region R02' to the right (horizontal direction) using the same method as for the extension to the left. The object determination unit 114 can also extend the second region R02' upward (in the vertical direction) and downward (in the opposite direction of the vertical direction) using the same method as for the leftward extension.

The object determination unit 114 determines, as the second class, the class of an object detected in the non-overlapping region among the second region R02 that does not overlap the first region R01.

The object determination unit 114 determines the class of the object as the second class when the first confidence level is less than a discrimination threshold, which is a predetermined confidence level threshold, in an overlapping region where the first region R01 and the second region R02 overlap. The information processing device 10 determines the class of an object in the overlapping region as the first class when the first confidence level is equal to or greater than the determination threshold in the overlapping region.

Note that the object determination unit 114 may determine the class of an object detected in the non-overlapping region of the first region R01 that does not overlap with the second region R02 as the first class.

Figure 7:
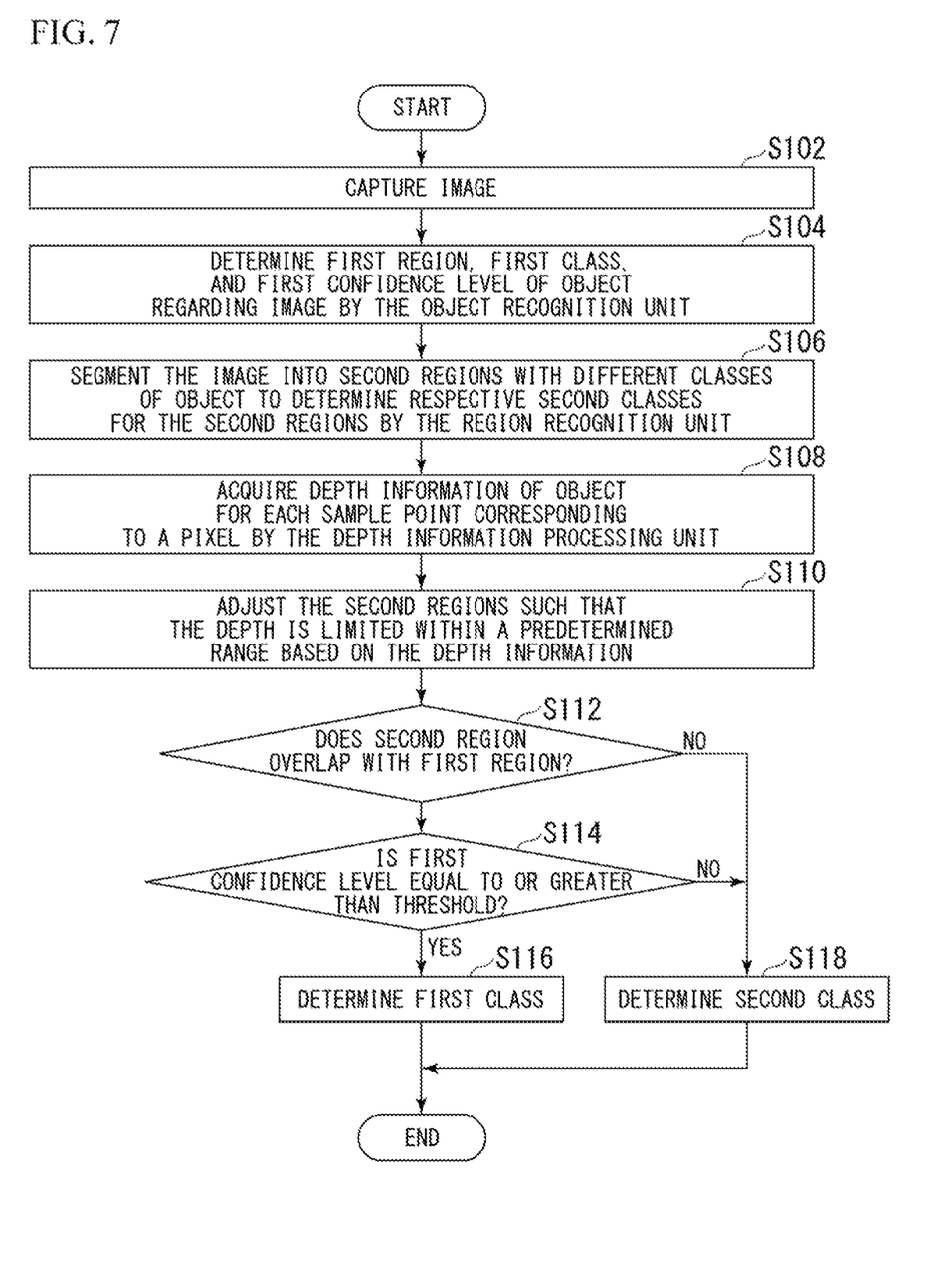
FIG. 7 is a flowchart showing an example of the object detection process according to the example embodiment.

Next, an example of object detection process according to the present example embodiment will be described. FIG. 7 is a flowchart showing an example of the object detection process according to the example embodiment.

(Step S102) The camera 102a captures an image within its field of view around the host unit, and outputs image data representing the captured image to the information detection unit 11. After that, the process proceeds to Step S104.

(Step S104) The object recognition unit 112a detects, as the first region, a region in which an object is represented from the image indicated by image data input from the camera 102a, determines the class of the object represented in the first region as the first class, and determines the confidence level thereof as the first confidence level. After that, the process proceeds to Step S106.

(Step S106) The region recognition unit 112b segments the image indicated by the image data into second regions, the second regions representing different classes of object, and determines the class of object represented in each of the second regions as the second class. After that, the process proceeds to Step S108.

(Step S108) The depth information processing unit 112c acquires depth information indicating the depth of the object for each sample point corresponding to each pixel from the distance information input from the ranging sensor 102b. After that, the process proceeds to Step S110.

(Step S110) Based on the depth information, the object determination unit 114 adjusts the second regions such that the depth of the object represented in the second regions is confined within a predetermined range. After that, the process proceeds to Step S112.

(Step S112) The object determination unit 114 determines whether or not the second regions overlap the first region. When it is determined that there is overlap (Step S112 YES), the process proceeds to Step S114. When it is determined that there is no overlap (Step S112) the process proceeds to Step S112.

(Step S114) The object determination unit 114 determines whether or not the first confidence level of the first region is equal to or greater than a predetermined discrimination threshold. When it is determined to be equal to or greater than the discrimination threshold (Step S114 YES), the process proceeds to Step S116. When it is determined to be less than the discrimination threshold (Step S114 NO), the process proceeds to Step S118.

(Step S116) The object determination unit 114 determines the class of the object represented in the overlapping region as the first class. After that, the processing of FIG. 7 ends.

(Step S118) The object determination unit 114 determines the class of the object represented in the overlapping region or the second region as the second class. After that, the processing of FIG. 7 ends.

Figure 8:
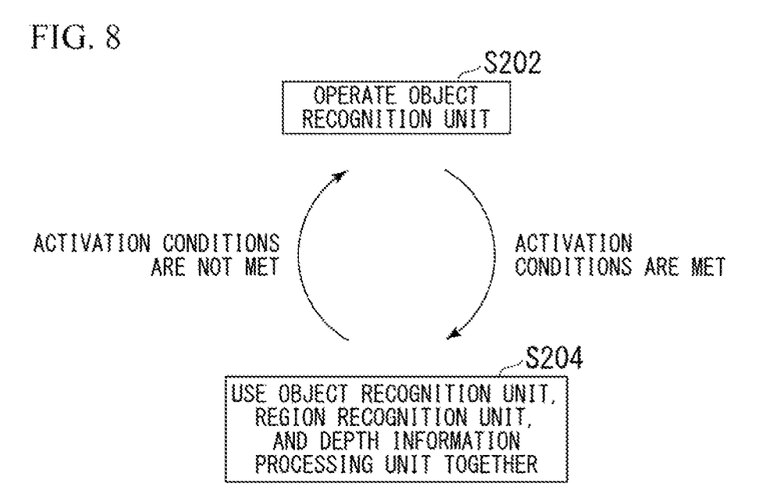
FIG. 8 is a state transition diagram showing an example of object detection control according to the example embodiment.

Next, an example of object detection control according to this example embodiment will be described. FIG. 8 is a state transition diagram showing an example of object detection control according to the example embodiment. However, it is assumed that the state of Step S202 is adopted when the information processing device 10 is powered on, that is, at the commencement of power supply.

(Step S202) In the object detection unit 112, the object recognition unit 112a operates, while the region recognition unit 112b and the depth information processing unit 112c are not active. The object detection control unit 116 determines whether or not each of the preset activation conditions is satisfied are met. Upon determining that any one of the activation conditions is met, the object detection control unit 116 activates the region recognition unit 112b and the depth information processing unit 112c, and proceeds to the state in Step S204.

(Step S204) In the object detection unit 112, the object recognition unit 112a, the region recognition unit 112b, and the depth information processing unit 112c operate, all of which are used together.

When the object detection control unit 116 determines that none of the preset activation conditions are met, the object detection unit 112 returns to Step S202.

Note that in the above description, the case was given as an example in which the object detection control unit 116 controls whether or not the region recognition unit 112b and the depth information processing unit 112c are activated immediately after determining the operating conditions, but is not limited thereto.

When a state satisfying any of the operating conditions to be determined continues for a predetermined period of time (for example, 30 seconds to 3 minutes), the object detection control unit 116 may determine to activate the region recognition unit 112b and the depth information processing unit 112c. Further, when a state not satisfying an operating condition to be determined continues for a predetermined time or longer, the object detection control unit 116 may determine not to activate the region recognition unit 112b and the depth information processing unit 112c.

Minimum Configuration

Figure 9:
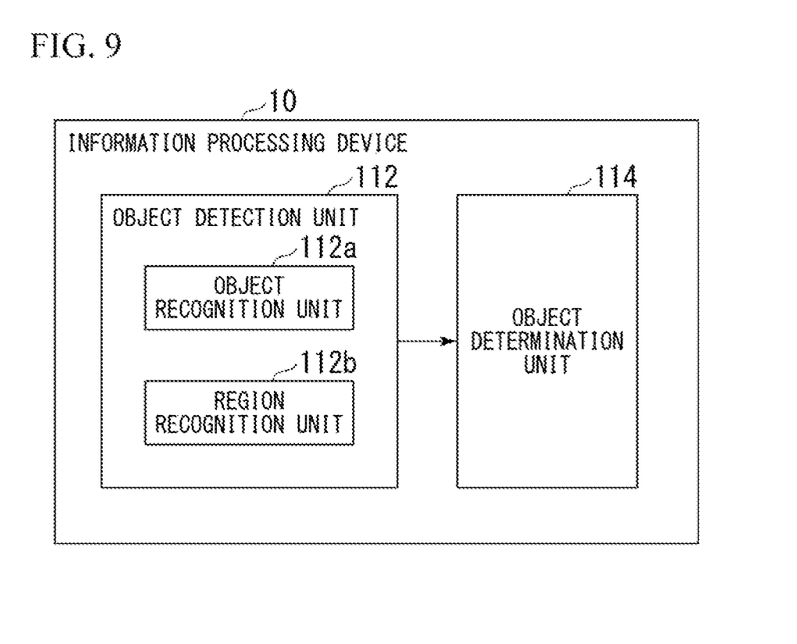
FIG. 9 is a schematic block diagram illustrating the minimum configuration of the present example embodiment.

Next, the minimum configuration of this example embodiment will be described. FIG. 9 is a schematic block diagram illustrating the minimum configuration of this example embodiment.

As shown in FIG. 9, the information processing device 10 according to this example embodiment is provided with an object detection unit 112 that detects objects around the host device, and an object determination unit 114 that determines the class of each detected object. The object detection unit 112 is provided with an object recognition unit 112a and a region recognition unit 112b. The object recognition unit 112a detects, from image data that represents an image using the signal value of each of the plurality of pixels, a first region, which is a region of an image in which an object is represented, and determines a first confidence level, which is the confidence level in a first class, which is the class of the object represented in the first region. The region recognition unit 112b segments the image indicated by the image data into second regions, which are regions representing different classes of object, and determines, for each second region, a second class, which is the class of the object represented in the second region. The object determination unit 114 determines, as a second class, the class of the object in a non-overlapping region among the second regions that does not overlap the first region, determines, as a second class, the class of the object in an overlapping region among the second regions that overlaps the first region if the first confidence level for the overlapping region is lower than a predetermined confidence level threshold, and determines the class of the object in the overlapping region as the first class if the first confidence level for the overlapping region is equal to or greater than the predetermined confidence level threshold.

According to this configuration, both object recognition and region recognition for image data are used. Since region recognition segments an image into regions for each different object represented in the image, it detects objects more reliably than object recognition, which identifies the region in which an object is represented. The class of object determined by object recognition is obtained as a determination result when the confidence level of the region in which the object is represented by the object recognition is high. Therefore, it is more reliable to detect an object and determine the class thereof than using object recognition alone.

The object detection unit 112 may also be provided with a depth information processing unit 112c that acquires depth information indicating the depth of the object for each sample point corresponding to a pixel, and the object determination unit 114 may adjust the second region so that the depth of the object represented in the second region is maintained within a predetermined range.

According to this configuration, since the second regions are adjusted so that the depth falls within the predetermined range, regions with significantly different depths are excluded from the second regions, and regions with common depths are included in the second regions. Also, depth can be measured more stably than images even in low illumination or in bad weather conditions. Therefore, regions in which each object is represented can be estimated more accurately as second regions. For example, individual regions are segmented based on depth even when objects of the same or similar class are adjacent to each other.

The information processing device 10 may be provided with the object detection control unit 116 that activates the region recognition unit 112b and the depth information processing unit 112c when, among objects detected by the object recognition unit 112a, there is estimated the presence of an object whose distance from the host device is greater than or equal to a predetermined distance threshold.

According to this configuration, by operating the region recognition unit 112b and the depth information processing unit 112c for an object far from the host device, it is possible to more reliably detect the region where the object is displayed and the class thereof. If no distant objects are detected, the region recognition unit 112b and the depth information processing unit 112c are allowed to stop operating, thus reducing the amount of processing.

Further, the information processing device 10 may be provided with the object detection control unit 116 that activates the region recognition unit 112b and the depth information processing unit 112c when information about the surrounding environment of the host device indicates a predetermined environment (for example, rainfall, dense fog, dark areas) that makes it difficult to detect the first region from the image data.

According to this configuration, if detection of the first region in which an object is represented by object recognition becomes difficult, the region where the object is displayed and the class thereof can be detected more reliably by operating the region recognition unit 112b and the depth information processing unit 112c. If detection of the first region does not become difficult, the operations of the region recognition unit 112b and the depth information processing unit 112c are allowed to stop, thus reducing the amount of processing.

Further, the information processing device 10 may be provided with the object detection control unit 116 that activates the region recognition unit 112b and the depth information processing unit 112c when the number of objects detected by the object recognition unit 112a is equal to or greater than a predetermined number threshold or when the interval between the first regions of each object detected by the object recognition unit 112a is equal to or less than a predetermined interval threshold.

According to this configuration, when a plurality of objects are detected at once, or when the regions of the detected objects are close to each other, the region where each object is displayed and the class thereof can be detected more accurately by operating the region recognition unit 112b and the depth information processing unit 112c. If the number of detected objects is small and they are not in close proximity, the operations of the region recognition unit 112b and the depth information processing unit 112c are allowed to stop, thus reducing the amount of processing.

Further, the information processing device 10 may be provided with the object detection control unit 116 that activates the region recognition unit 112b and the depth information processing unit 112c when the class of an object detected by the object recognition unit 112a is a predetermined class, or when the class of the object is not determined by the object recognition unit 112a.

According to this configuration, when there is a tendency for the class of a predetermined object to be erroneously recognized, or when the class of the object cannot be specified, the class of the object can be more reliably detected by operating the region recognition unit 112b and the depth information processing unit 112c. When the class of the object is specified and the detected object does not tend to be erroneously recognized, the operations of the region recognition unit 112b and the depth information processing unit 112c are allowed to stop, thus reducing the amount of processing.

Further, the information processing device 10 may be provided with the object detection control unit 116 that activates the region recognition unit 112b and the depth information processing unit 112c when the velocity of a vehicle carrying the host unit becomes equal to or greater than a predetermined velocity threshold, or an estimated time to collide based on the distance from the host unit to an object detected by the object recognition unit 112a and the velocity of the vehicle is equal to or less than a predetermined estimated time to collide threshold.

According to this configuration, the region where an object is represented can be detected more reliably by operating the region recognition unit 112b and the depth information processing unit 112c when the traveling velocity is increased or a collision with an object is expected. Therefore, it is possible to contribute to the realization of more accurate control under conditions where safety is required. When the traveling velocity is low and collision with an object is expected, the operations of the region recognition unit 112b and the depth information processing unit 112c are allowed to stop, thus reducing the amount of processing.

The information processing device 10 described above may include a computer system therein. For example, the processor described above can be a component of the computer system. The ECU also includes a computer system. Each process described above is stored in a computer-readable storage medium in the form of a program, which is read and executed by a computer to perform these processes. The "computer system" referred to here includes software such as an operating system, device drivers and utility programs, and hardware such as peripheral devices. In addition, the computer-readable recording medium refers to portable media such as magnetic discs, optical discs, ROM (Read Only Memory), semiconductor memory, and storage devices such as hard disks built into computer systems. Furthermore, a computer-readable recording medium may include one that dynamically stores a program for a short period of time, such as a communication line used for transmitting a program over a network such as the Internet or a communication line such as a telephone line, or one that holds a program for a certain period of time, such as a volatile memory inside a computer system serving as a server or a client. Further, the above program may be one for realizing some of the above-described functions, or may be a so-called differential file (differential program) capable of realizing the above-described functions in combination with a program previously recorded in a computer system.

Also, part or all of the information processing device 10 in the above-described example embodiment may be implemented as an integrated circuit such as LSI (Large Scale Integration). Each functional block of the information processing device 10 may be individually processorized, or some or all of them may be integrated with one another and processorized. Also, the method of circuit integration is not limited to LSI, but may be realized by a dedicated circuit or a general-purpose processor. In addition, in the case that an integrated circuit technology emerges as an alternative to LSI due to advances in semiconductor technology, an integrated circuit based on this technology may be used.

Although a preferred example embodiment of the present invention has been described above, the present invention is not limited to this example embodiment and modifications thereof. Configuration additions, omissions, substitutions, and other changes are possible without departing from the gist of the present invention.

Moreover, the present invention is not limited by the foregoing description, but only by the appended claims.

INDUSTRIAL APPLICABILITY

According to each of the information processing device, information processing method, and program described above, object recognition and region recognition for image data are used together. Since region recognition segments an image into regions for each different object represented in the image, it detects objects more reliably than object recognition, which identifies the region in which an object is represented. The class determined by object recognition is obtained as a determination result when the confidence level of the region in which the object is represented by the object recognition is high. Therefore, it is possible to detect an object and determine the class thereof more reliably than using object recognition alone.

REFERENCE SIGNS LIST

1 Vehicle control system
10 Information processing device
11 Information detection unit
12 Position estimation unit
13 Situation analysis unit
14 Movement planning unit
15 Movement control unit
101 Operation unit
102 Information collection unit
102a Camera
102b Ranging sensor
103 Communication unit
104 In-vehicle device
105 Output control unit
106 Output unit
107 Drive system control unit
108 Drive system
109 Vehicle body system control unit
110 Vehicle system
111 Storage unit
112 Object detection unit
112a Object recognition unit 112b Region recognition unit
112c Depth information processing unit
114 Object determination unit
116 Object detection control unit

What is claimed is:

1. An information processing device comprising:
a memory configured to store instructions; and
a processor configured to execute the instructions to detect an object around the information processing device and determine a class of the object,
wherein the processor is configured to execute the instructions to:
detect, from image data that represents an image using respective signal values of a plurality of pixels, a first region that is a region representing the object in the image, and determine a first confidence level that is a class confidence level for a first class, the first class being a class of the object represented in the first region;
segment the image of the image data into second regions representing different classes of an object, and determine, for each of second region, a second class that is a class of an object in the second region;
determine, as the second class, a class of an object in a non-overlapping region that is the second regions that do not overlap with the first region,
determine, as the second class, a class of an object in an overlapping region that is the second regions that overlap with the first region in case of the first confidence level for the overlapping region lower than a predetermined confidence level threshold; and
determine the class of the object in the overlapping region as the first class in case of the first confidence level for the overlapping region equal to or greater than the predetermined confidence level threshold.

2. The information processing device according to claim 1, wherein the processor is configured to execute the instructions to:
acquire depth information indicating a depth of an object for each of sample points corresponding to the plurality of pixels; and
adjust the second region so that the depth of the object represented in the second region is maintained within a predetermined range.

3. The information processing device according to claim 2, wherein the processor is configured to execute the instructions to start the segmentation of the image and start the acquisition of the depth information in case of presence of an object, among detected objects, at a distance from the information processing device being greater than or equal to a predetermined distance threshold.

4. The information processing device according to claim 2, wherein the processor is configured to execute the instructions to start the segmentation of the image and start the acquisition of the depth information in case of information on the surrounding environment around the information processing device indicating a predetermined environment difficult to detect the first region from the image data.

5. The information processing device according to claim 2, wherein the processor is configured to execute the instructions to start the segmentation of the image and start the acquisition of the depth information in case of a number of detected objects equal to or greater than a predetermined number threshold or in case of an interval between the first regions of each detected object being equal to or less than a predetermined interval threshold.

6. The information processing device according to claim 2, wherein the processor is configured to execute the instructions to start the segmentation of the image and start the acquisition of the depth information in case of a class of a detected object being a predetermined class, or in case of the class of the object not determined.

7. The information processing device according to claim 2, wherein the processor is configured to execute the instructions to start the segmentation of the image and start the acquisition of the depth information in case of a velocity of a vehicle carrying the information processing device becoming equal to or greater than a predetermined velocity threshold, or an estimated time to collide based on a distance from the information processing device to a detected object and the velocity of the vehicle becoming equal to or less than a predetermined threshold for time to collide.

8. An information processing method executed by an information processing device, the information processing method comprising:
detecting, from image data that represents an image using respective signal values of a plurality of pixels, a first region that is a region representing an object in the image, and determining a first confidence level that is a class confidence level for a first class, the first class being a class of the object represented in the first region;
segmenting the image of the image data into second regions representing different classes of an object, and determining, for each second region, a second class being a class of an object in the second region;
determining, as the second class, a class of an object in a non-overlapping region that is the second regions that do not overlap with the first region;
determining, as the second class, the class of the object in an overlapping region that is the second regions that overlap with the first region in case of the first confidence level for the overlapping region lower than a predetermined confidence level threshold; and
determining the class of the object in the overlapping region as the first class in case of the first confidence level for the overlapping region equal to or greater than the predetermined confidence level threshold.

9. A non-transitory computer-readable medium storing a program for causing a computer to execute:
detecting an object around the information processing device and determining a class of the object,
wherein the program causes the computer to execute:
detecting, from image data that represents an image using respective signal values of a plurality of pixels, a first region that is a region representing the object in the image, and determining a first confidence level that is a class confidence level for a first class, the first class being a class of the object represented in the first region;
segmenting the image of the image data into second regions representing different classes of an object, and determining, for each of second region, a second class being a class of an object in the second region;
determining, as the second class, a class of an object in a non-overlapping region that is the second regions that do not overlap with the first region;
determining, as the second class, a class of an object in an overlapping region that is the second regions that overlap with the first region in case of the first confidence level for the overlapping region lower than a predetermined confidence level threshold; and determining the class of the object in the overlapping region as the first class in case of the first confidence level for the overlapping region equal to or greater than the predetermined confidence level threshold.

\* \* \* \* \*